United States Patent
Bernstein et al.

[11] 3,890,045
[45] June 17, 1975

[54] PHOTOGRAPHIC PRINTING APPARATUS

[76] Inventors: Herbert J. Bernstein, 43 Canton Ave., Amherst, Mass. 01002; William J. Arnold, 73 Bardwell St., Florence, Mass. 01060

[22] Filed: Feb. 22, 1974

[21] Appl. No.: 444,854

[52] U.S. Cl. ............... 355/73; 355/44; 355/45
[51] Int. Cl. ................................ G03b 27/60
[58] Field of Search ............... 355/44, 45, 73, 74

[56] References Cited
UNITED STATES PATENTS

| 1,745,900 | 2/1930 | Lowen | 355/74 |
| 1,813,690 | 7/1931 | Weisker | 355/44 |
| 2,287,271 | 6/1942 | Powers | 355/73 |
| 3,240,115 | 3/1966 | Robbins | 355/45 |
| 3,782,820 | 1/1974 | Kohn | 355/45 |

Primary Examiner—John M. Horan
Attorney, Agent, or Firm—Thomas N. Tarrant

[57] ABSTRACT

A photographic reader-printer in which printing paper is held flat and supported for exposure by a vacuum platen operating against its back surface so that the sensitive side is down for receiving upwardly directed image illumination. A transparent vacuum platen having a frosted glass lower face is disclosed as an aid in focusing or aligning in the absence of printing paper.

1 Claim, 4 Drawing Figures

PATENTED JUN 17 1975  3,890,045

SHEET 1

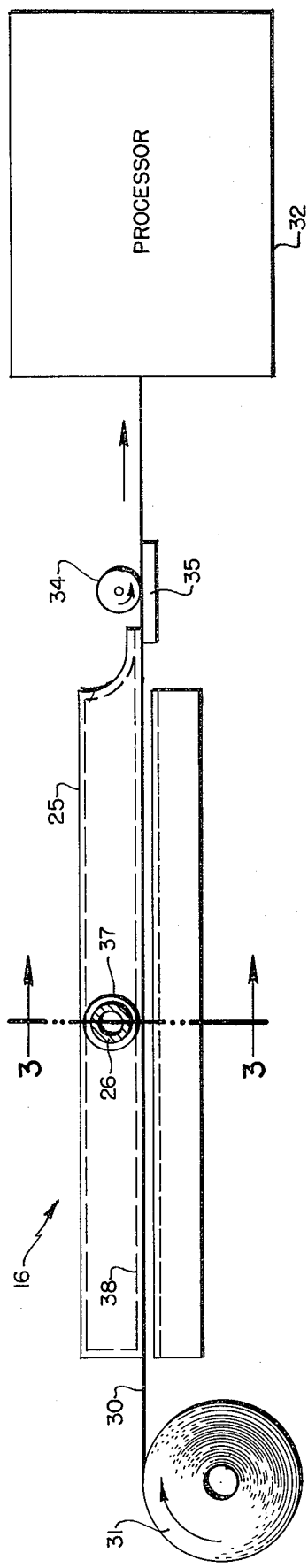
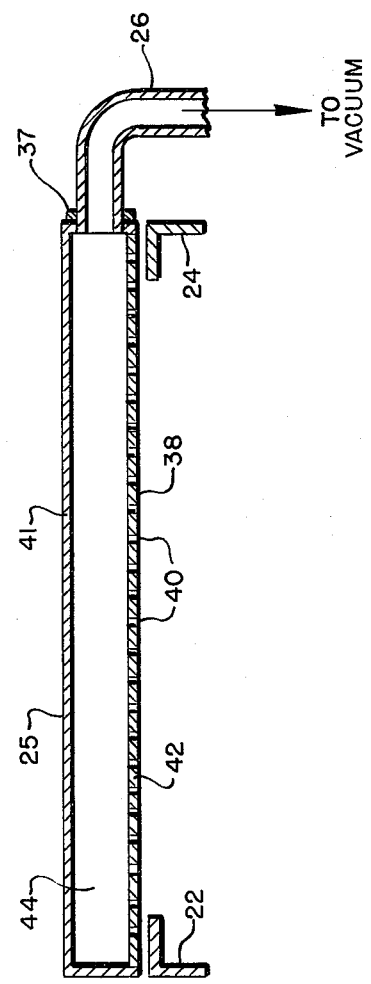

PHOTOGRAPHIC PRINTING APPARATUS

BACKGROUND OF THE INVENTION

1. Field of the Invention:

The invention relates to photographic printers and in particular to the use of vacuum platens in photographic printing apparatus.

2. Description of the Prior Art:

The tremendous increase in the use of microfilm has spawned a large number and variety of reader-printers. These reader-printers permit enlarged viewing of microfilm with sheet printout when desired. While resolution capabilities of these reader-printers is frequently very good, they are not called upon to reproduce continuous tones and photographic quality as such is of no importance. Seeing them as self-enclosed dark rooms with the possibilities of high speed and ease of printing, there have been attempts to modify these reader-printers for conventional photographic printing. These attempts have not been too successful since the resulting reproductions have usually displayed excessive contrast for continuous tone purposes and have frequently displayed undesired fogging in the resulting prints.

Vacuum platens are known in various types of photocopying and other camera apparatus. Most commonly the purpose of the vacuum is only to hold the photosensitive material flat and smooth on top of the platen. In U.S. Pat. No. 3,762,815 to Friedel, a rotatable vacuum platen is disclosed which can hold a photosensitive material in either a vertical or a horizontal position and on either surface. The Friedel apparatus is not suited for large quantity photoprinting and requires that the photosensitive material be placed manually in individual sheets on the platen. It is, in effect, a highly specialized camera without processing facilities.

U.S. Pat. No. 3,526,458 to Meyers et al discloses a microfilm reader-printer with a vacuum platen supporting print material on its upper surface. Microfilm reader-printers generally capable of mass quantity photoprinting but without adequate implementation for high quality continuous tone printing are, by way of example, the 18.24 Reader Printers models AC, RF and F of Itek Business Products, Rochester, N.Y.

SUMMARY OF THE INVENTION

In accordance with the present invention it has been found that a large portion of the difficulties encountered in continuous tone printing using modified microfilm reader-printers is related to the glass platen supporting the printing paper. Thus, the present invention provides a substitute for the glass platen in which the printing paper is supported by a vacuum platen positioned above and against the back of the paper to flatten the paper during exposure. The bottom surface of the vacuum platen adjacent to the printing position may be a frosted glass and the upper surface of the platen may be transparent to allow viewing and focusing through the platen.

Thus, it is an object of the invention to provide a novel photographic reader-printer.

It is a further object of the invention to provide a novel vacuum platen for supporting photographic printing paper at the exposing station.

A further object of the invention is to provide guides in combination with the vacuum platen for supporting printing paper within the operative field of the vacuum platen in the absence of vacuum pressure.

A further object of the invention is to provide a vacuum platen for supporting printing paper in a photographic exposure station of frosted and transparent material to permit viewing and focusing of an image through the platen.

Still a further object of the invention is to provide a vacuum platen supporting photographic printing paper for exposure having a built-in alignment scale.

Further objects and features of the invention will be understood upon reading the following description together with the drawing.

BRIEF DESCRIPTION OF THE DRAWING:

FIG. 2 is a diagrammatic illustration of a print exposure station according to the invention showing the print paper feeding the station and a following photographic processor.

FIG. 3 is a cross section of a vacuum platen and edge guide rails according to the invention.

Figure 1:
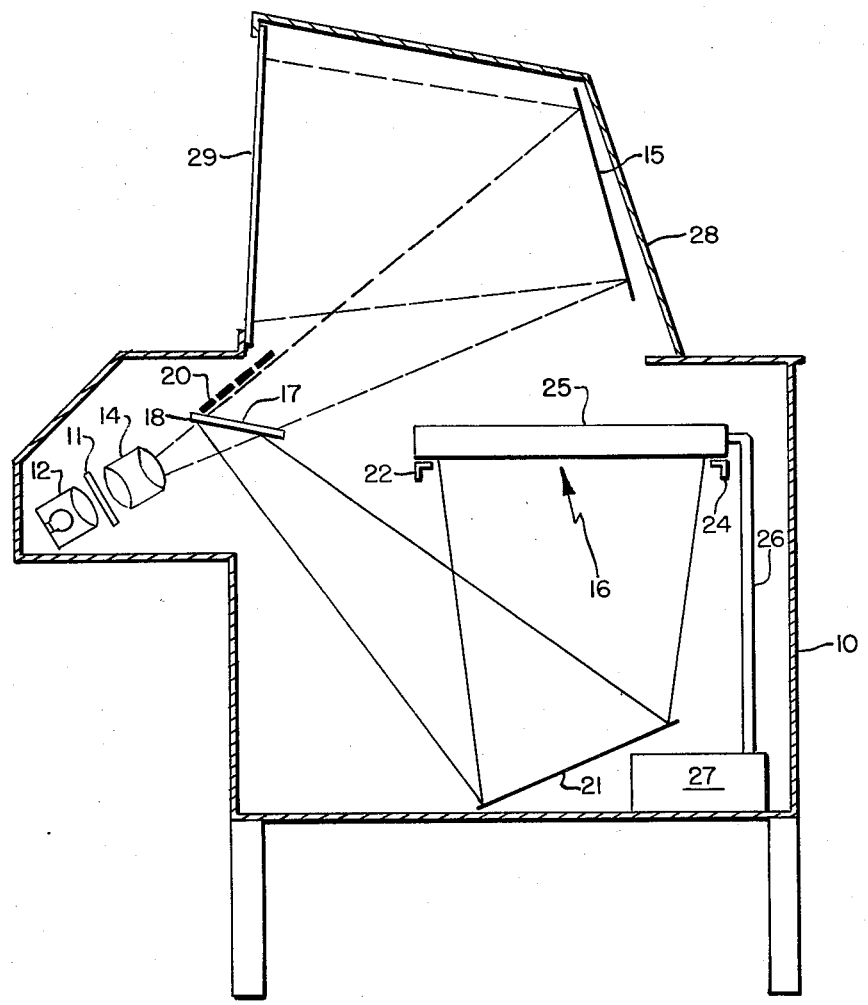
FIG. 1 is a diagrammatic illustration of a reader-printer according to the invention.

DESCRIPTION OF THE PREFERRED EMBODIMENT:

FIG. 1 depicts in diagrammatic fashion a typical microfilm reader-printer adapted for photographic printing and processing in accordance with the invention. The reader-printer is supported and enclosed in desk type housing 10. A film projector having negative holder 11, light source 12 and projection lens assembly 14 is provided for projecting images from conventional photographic negatives. On top of housing 10 is mounted translucent viewing screen 29 which may be ground glass. Exposure station 16 is positioned in a substantially horizontal plane near the top of housing 10 facing downward. In front of projection lens 14 is movable mirror 17 which moves on hinge axis 18 between the position shown and an alternative position indicated by dashed line 20. Projection lens 14 is aligned with viewing mirror 15 so that when mirror 17 is in position 20, a negative in holder 11 is projected onto viewing screen 29. When mirror 17 is in the depicted position, the projected image is reflected downward by mirror 17 to second mirror 21 below exposure station 16. Mirror 21 is positioned with an attitude to reflect the projected image to exposure station 16. At exposure station 16 is a front edge guide rail 22 and a rear guide rail 24. Immediately above guide rails 22 and 24 is a vacuum platen 25 provided with a vacuum hose 26 to a vacuum pump 27. Viewing screen 29 is supported and protected by hood 28 mounted on the top of housing 10.

Referring now to FIG. 2, a path for printing paper 30 extends from paper roll 31 through exposure station 16 to activating and stabilizing apparatus in processor 32. Drive roller 34 operating against a guide plate 35 drives printing paper 30 from paper roll 31 through exposure station 16 and into processor 32. When the vacuum is off, each edge of print paper 30 is supported by edge guides 22 and 24 positioned below the paper in exposure station 16. Edge guides 22 and 24 support the edges of printing paper 30 at a height to maintain the paper within the effective field of vacuum platen 25 positioned above edge guides 22 and 24 so that printing paper 30 passes therebetween. Vacuum platen 25 has a hose 26 extending from its rear side for connection to a vacuum pump. The bottom surface 38 of vacuum platen 25 is perforated with apertures 40 to provide vacuum passages attracting printing paper 30 uniformly against surface 39.

Now referring to FIG. 3, an embodiment of vacuum platen 25 is depicted in more detail and is viewed in a front to back section. For purposes of orientation, referring to FIG. 1, the left of the diagram is the front and the right is the rear. Facing the reader-printer from the front, paper roll 31 would be situated on the left as depicted in FIG. 2 and the processor 32 would be on the right.

Platen 25 in the embodiment depicted in FIG. 3 has upper wall 41 and bottom wall 42 enclosing vacuum plenum 44. Bottom 42 is pierced by a plurality of apertures 40. Top 41 and bottom 42 are made of glass, clear plastic or other transparent material sufficiently strong to maintain dimensional stability in the presence of a vacuum. Bottom surface 38 is desirably frosted or ground in order to provide an observable image plane. This surface is sufficiently close to the exposure plane for printing paper so that it may be used for accurate focusing and alignment. Apertures 40 may be either small enough in large numbers to reduce interference with the image or they may be larger and spaced adequately to focus using image portions between the apertures.

Figure 4:
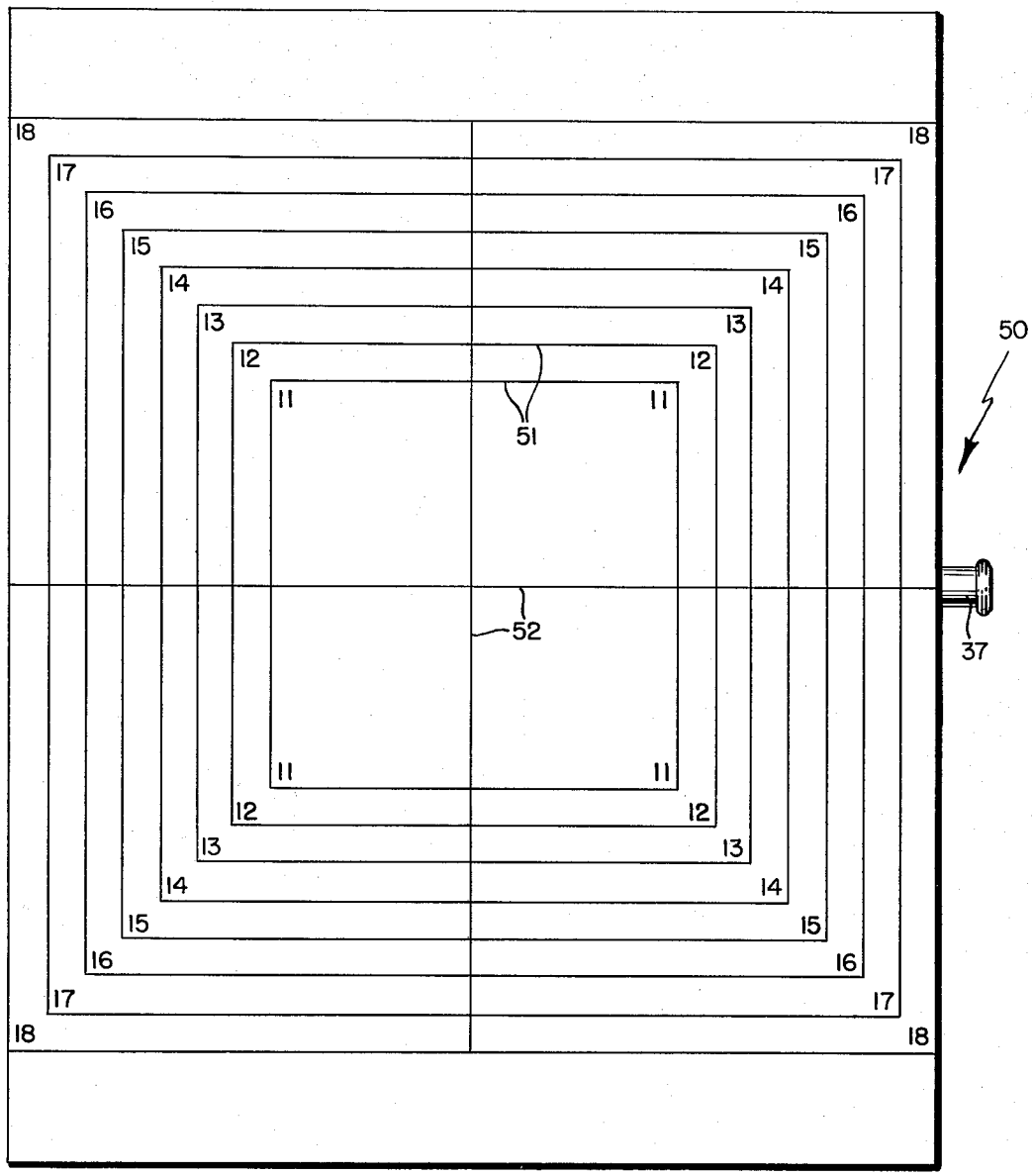
FIG. 4 is a plan view of the inventive vacuum platen showing the alignment scale.

FIG. 4 depicts the bottom surface 38 of vacuum platen 25 inscribed with the alignment and focusing scale 50. It will be understood that while this scale is inscribed in the bottom surface of the platen that FIG. 4 is in plan view looking at it from above. The scale is made with a series of concentric polygons 51 with 1 inch spacings starting at 11 inches on the side and going to 18 inches on the side and marked with numerals accordingly. While 1 inch spaces are shown, other spacing may be utilized and the metric measurement system is also contemplated. A pair of cross lines 52 have also been inscribed in surface 38 and are useful as a centering aid. Perforations 40 have been omitted from FIG. 4 for ease of illustration.

While the invention has been described in relation to a specific reader-printer, the viewing hood is not essential to the invention and a printer-processor with other viewing means is contemplated. It will also be recognized that the invention is not limited as to the characteristics of the film or the print paper either of which can be in roll or cut form. It will be recognized, however, that cut sheet feeding, for automatic printing and processing, adds considerably to the complexity of the overall apparatus. Thus, a range of variations from the disclosed embodiment are contemplated and it is intended to cover the invention within the full scope of the following claims.

We claim:

1. In a photographic printer-processor having a projector, a print exposure station, a roll-feed for providing printing paper to said exposure station and a processor for activating and stabilizing prints, the combination in said print exposure station comprising:
   a. A fixed vacuum platen positioned adjacent to and above the path of travel of printing paper for supporting and holding printing paper uniformly flat during exposure;
   b. a pair of edge support rails positioned below said vacuum platen providing a support surface for supporting printing paper within the pneumatic field of influence of said platen;
   c. a guide plate positioned following said vacuum platen in the path of travel of said printing paper, the lower surface of said vacuum platen proximate to and overlapping the top surface of said guide plate; and,
   d. a drive roller positioned above and coacting with said guide plate for driving said printing paper through said exposure station, said overlap providing vacuum pressure at the region of overlap.

* * * * *